United States Patent
Yokokawa et al.

(10) Patent No.: US 9,434,390 B2
(45) Date of Patent: Sep. 6, 2016

(54) VEHICLE CONTROL DEVICE AND VEHICLE CONTROL METHOD

(71) Applicant: Toyota Jidosha Kabushiki Kaisha, Toyota-shi (JP)

(72) Inventors: Takahiro Yokokawa, Susono (JP); Masami Kondo, Niwa-gun (JP); Youhei Hareyama, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/737,752

(22) Filed: Jun. 12, 2015

(65) Prior Publication Data

US 2016/0009292 A1    Jan. 14, 2016

(30) Foreign Application Priority Data

Jul. 14, 2014 (JP) ................. 2014-144147

(51) Int. Cl.
| | |
|---|---|
| *B60W 10/02* | (2006.01) |
| *B60W 10/06* | (2006.01) |
| *B60W 10/101* | (2012.01) |
| *B60W 50/00* | (2006.01) |
| *B60W 10/10* | (2012.01) |

(52) U.S. Cl.
CPC .......... *B60W 50/0098* (2013.01); *B60W 10/02* (2013.01); *B60W 10/06* (2013.01); *B60W 10/10* (2013.01); *B60W 2710/02* (2013.01); *B60W 2710/06* (2013.01); *B60W 2710/10* (2013.01)

(58) Field of Classification Search
None
See application file for complete search history.

(56) References Cited

U.S. PATENT DOCUMENTS

| | | | |
|---|---|---|---|
| 2002/0011792 A1* | 1/2002 | Taniguchi ............ | B60W 10/06 315/76 |
| 2004/0127332 A1* | 7/2004 | Kang .................... | B60W 10/02 477/45 |
| 2005/0079947 A1* | 4/2005 | Fukuyama .......... | F16H 61/6649 476/10 |
| 2010/0210413 A1* | 8/2010 | Yokokawa ............ | B60W 10/11 477/40 |

FOREIGN PATENT DOCUMENTS

JP    2012-201194    10/2012

* cited by examiner

*Primary Examiner* — Edwin A Young
(74) *Attorney, Agent, or Firm* — Oblon, McClelland, Maier & Neustadt, L.L.P.

(57) ABSTRACT

A vehicle control device includes a control unit configured to execute free-run traveling in which an engine is stopped and a clutch that transmits power of the engine to a drive wheel is disengaged, at a time acceleration is not requested during traveling. The control unit is configured to prohibit upshifting of a continuously variable transmission at least during execution of the free-run traveling, drive the engine from the free-run traveling state in response to an acceleration request, and upshift the continuously variable transmission at a time of returning to a normal traveling state in which the clutch is engaged.

5 Claims, 5 Drawing Sheets

VEHICLE CONTROL DEVICE AND VEHICLE CONTROL METHOD

CROSS-REFERENCE TO RELATED APPLICATION(S)

The present application claims priority to and incorporates by reference the entire contents of Japanese Patent Application No. 2014-144147 filed in Japan on Jul. 14, 2014.

BACKGROUND OF THE INVENTION

1. Field of the Invention

The present invention relates to a vehicle control device and a vehicle control method for a vehicle that can execute free-run traveling.

2. Description of the Related Art

In a hybrid vehicle, when acceleration is requested during EV traveling in which an engine is stopped and a clutch is disengaged, the engine is re-started and the clutch is engaged. At this time, to promptly increase a rotation speed of the engine, a part of drive torque of a motor is used. Therefore, when the clutch is engaged, a driver might have difficulty in feeling the sense of acceleration and drivability may be deteriorated due to lack of the drive torque. In view of the circumstances, Japanese Patent Application Laid-open No. 2012-201194 has proposed a technique in which an output torque is transmitted to a drive wheel by upshifting of continuously variable transmission, the output torque being obtained such that inertia torque of the continuously variable transmission is added to the drive torque of the motor, so that the deterioration of the drivability is suppressed.

By the way, a vehicle is conventionally known, which can execute free-run traveling in which the engine is stopped and the clutch is disengaged when the acceleration is not requested during traveling. Suppression of the deterioration of the drivability can be considered by applying of the technique disclosed in Japanese Patent Application Laid-open No. 2012-201194 to such a vehicle, when the vehicle returns from the free-run traveling state to a normal traveling state in which the engine is started and the clutch is engaged, in response to an acceleration request. However, at this time, when the vehicle does not include a motor, the vehicle cannot increase the rotation speed of the engine using the drive torque of the motor, and thus requires a lot of time to start the engine, compared with a hybrid vehicle. Accordingly, when the vehicle returns from the free-run traveling state to the normal traveling state, a lot of time is required to re-accelerate the vehicle by the engine. Therefore, when the vehicle that can execute the free-run traveling does not include the motor, the deterioration of the drivability cannot be suppressed when the vehicle returns from the free-run traveling state to the normal traveling state even if the technique disclosed in Japanese Patent Application Laid-open No. 2012-201194 is applied to the vehicle.

There is a need for a vehicle control device and a vehicle control method, which can suppress the deterioration of the drivability when the vehicle returns from the free-run traveling state to the normal traveling state.

SUMMARY OF THE INVENTION

It is an object of the present invention to at least partially solve the problems in the conventional technique.

A vehicle control device includes: a control unit configured to execute free-run traveling in which an engine is stopped and a clutch that transmits power of the engine to a drive wheel is disengaged, at a time acceleration is not requested during traveling, and the control unit is configured to prohibit upshifting of a continuously variable transmission at least during execution of the free-run traveling, drive the engine from the free-run traveling state in response to an acceleration request, and upshift the continuously variable transmission at a time of returning to a normal traveling state in which the clutch is engaged.

A vehicle control method includes: a control step of executing free-run traveling in which an engine is stopped and a clutch that transmits power of the engine to a drive wheel is disengaged, at a time acceleration is not requested during traveling, and the control step includes: prohibiting upshifting of a continuously variable transmission at least during execution of the free-run traveling; driving the engine from the free-run traveling state in response to an acceleration request; and upshifting the continuously variable transmission at a time of returning to a normal traveling state in which the clutch is engaged.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a configuration of a vehicle control device and a vehicle control method according to an embodiment of the present invention will be described in detail with reference to the drawings.

Configuration of Vehicle

First, a configuration of a vehicle to which a vehicle control device according to the embodiment is applied will be described with reference to FIG. 1.

Figure 1:
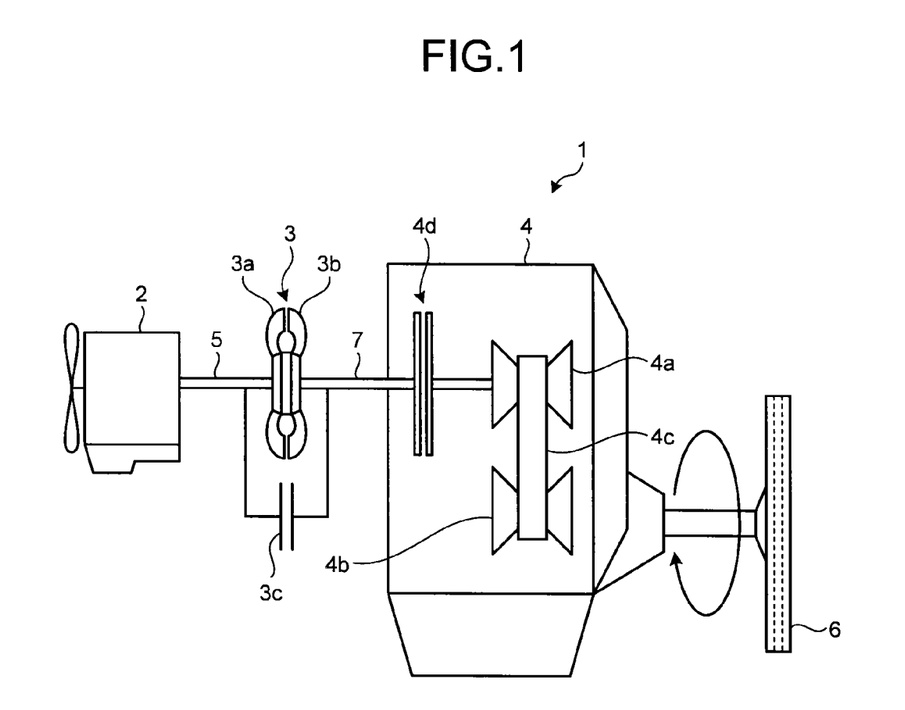
FIG. 1 is a schematic diagram illustrating a configuration of a vehicle to which a vehicle control device according to an embodiment of the present invention is applied.

FIG. 1 is a schematic diagram illustrating a configuration of a vehicle to which a vehicle control device according to the embodiment is applied. As illustrated in FIG. 1, a vehicle 1 to which a vehicle control device according to the embodiment is applied includes an engine 2, a torque converter 3, and a continuously variable transmission (CVT) 4, as principal configuration elements.

The engine 2 functions as a power source of the vehicle 1, and is coupled with the continuously variable transmission 4 through the torque converter 3. An output torque of the engine 2 is input from an output shaft 5 of the engine 2 to the continuously variable transmission 4 through the torque converter 3, and is transmitted from the continuously variable transmission 4 to a drive wheel 6 of the vehicle 1 through a differential mechanism and the like (not illustrated). In this way, a power transmission path is formed between the engine 2 and the drive wheel 6.

The torque converter 3 includes a pump impeller 3a connected to the output shaft 5 of the engine 2, and a turbine runner 3b connected to an input shaft 7 of the continuously variable transmission 4. The pump impeller 3a is an input member to which the output torque of the engine 2 is input, and the turbine runner 3b is an output member that outputs the output torque of the engine 2. The torque converter 3 can transmit the output torque of the engine 2 between the pump impeller 3a and the turbine runner 3b through a differential fluid.

The torque converter 3 includes a lock-up (L/U) clutch 3c. The L/U clutch 3c is a friction engagement-type clutch device arranged in the power transmission path of between the engine 2 and the drive wheel 6. The L/U clutch 3c can connect the output shaft 5 of the engine 2 and the input shaft 7 without through the differential fluid.

When the L/U clutch 3c is disengaged, the torque converter 3 transmits the output torque of the engine 2 to the continuously variable transmission 4 with the output shaft 5 and the input shaft 7 through the differential fluid. Meanwhile, when the L/U clutch 3c is engaged, the torque converter 3 directly connects the pump impeller 3a and the turbine runner 3b, and transmits the output torque of the engine 2 to the continuously variable transmission 4 with the output shaft 5 and the input shaft 7 without through the differential fluid.

The continuously variable transmission 4 is configured with a known belt-type continuously variable transmission. The continuously variable transmission 4 includes a primary pulley 4a provided at a side near the engine 2, and a secondary pulley 4b provided at a side near the drive wheel 6, a belt 4c, and a C1 clutch 4d. The primary pulley 4a is coupled with the input shaft 7. The secondary pulley 4b is coupled with an output shaft (not illustrated). The belt 4c is stretched between the primary pulley 4a and the secondary pulley 4b.

The C1 clutch 4d is provided on the input shaft 7, and is arranged in series with the L/U clutch 3c in the power transmission path of between the engine 2 and the drive wheel 6. The C1 clutch 4d includes an engine-side engagement element coupled with an engine 2 side of the input shaft 7, and a drive wheel-side engagement element coupled with a drive wheel 6 side of the input shaft 7.

The C1 clutch 4d connects the power transmission path of between the engine 2 and the drive wheel 6 by engaging the engine-side engagement element and the drive wheel-side engagement element. Meanwhile, the C1 clutch 4d cuts the power transmission path of between the engine 2 and the drive wheel 6 by disengaging the engine-side engagement element and the drive wheel-side engagement element. In other words, the C1 clutch 4d functions as a switch device that switches a state of the power transmission path of between the engine 2 and the drive wheel 6 to between a power transmittable state, and a power non-transmittable state.

Configuration of Vehicle Control Device

Next, a configuration of a vehicle control device according to the embodiment will be described with reference to FIG. 2.

Figure 2:
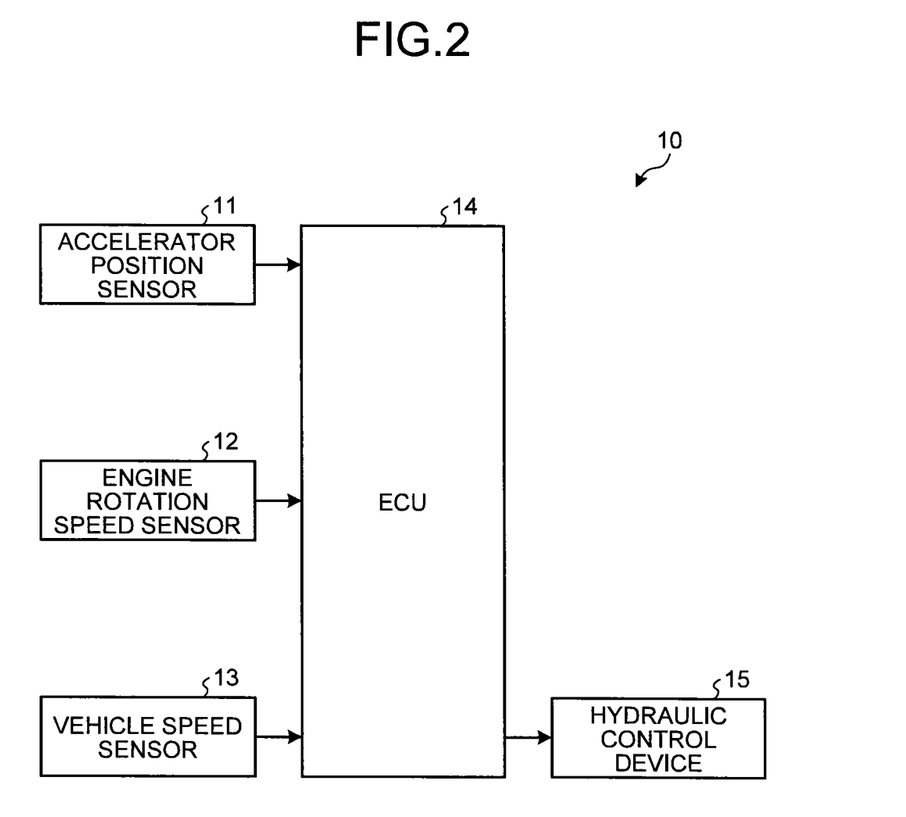
FIG. 2 is a block diagram illustrating a configuration of a vehicle control device according to the embodiment of the present invention.

FIG. 2 is a block diagram illustrating a configuration of a vehicle control device according to the embodiment. As illustrated in FIG. 2, a vehicle control device 10 according to the embodiment includes an accelerator position sensor 11, an engine rotation speed sensor 12, a vehicle speed sensor 13, an electronic control unit (ECU) 14, and a hydraulic control device 15. The ECU 14 functions as a control unit according to the present invention.

The accelerator position sensor 11 detects an operation amount of an acceleration pedal (the accelerator opening degree) of the vehicle 1, and outputs a signal that indicates a detected accelerator opening degree to the ECU 14.

The engine rotation speed sensor 12 detects a rotation speed of the engine 2, and outputs a signal that indicates a detected engine rotation speed to the ECU 14.

The vehicle speed sensor 13 detects a speed of the vehicle 1 (vehicle speed), and outputs a signal that indicates a detected vehicle speed to the ECU 14.

The ECU 14 is configured with a CPU, a RAM, a ROM, and an electronic circuit mainly including a known microcomputer including an interface and the like. A function of the ECU 14 is realized such that the CPU executes a control program loaded from the ROM to the RAM to operate various devices in the vehicle 1, and to perform reading and writing of data in the RAM or the ROM, under control of the CPU.

The ECU 14 comprehensively controls the engine 2, the torque converter 3, and the hydraulic control device 15, based on information of various sensors in the vehicle 1 including the above-described configuration elements. To be specific, the ECU 14 determines a fuel injection amount, injection timing, ignition timing, and the like, based on operation states of the engine 2, such as the engine rotation speed, an intake air amount, and the throttle opening degree, and controls an injector, an ignition plug, and the like, based on determined information.

The ECU 14 stores, in the ROM, data of a variable speed diagram (variable speed map) that describes relationship between the accelerator opening degree and the vehicle speed of the vehicle 1, and a variable speed ratio (a value obtained by dividing the rotation speed of the primary pulley 4a by the rotation speed of the secondary pulley 4b) of the continuously variable transmission 4. The ECU 14 determines the variable speed ratio of the continuously variable transmission 4 from the variable speed diagram based on the accelerator opening degree and the vehicle speed respectively detected by the accelerator position sensor 11 and the vehicle speed sensor 13, and controls the hydraulic control device 15 so as to establish the determined variable speed ratio.

Here, examples of variable speed lines illustrated in the variable speed diagram include: an upshift line that defines relationship between the accelerator opening degree and the vehicle speed, at which the speed should be changed toward a side into which the variable speed ratio of the continuously variable transmission 4 is decreased, that is, upshifting should be performed; and a downshift line that defines the accelerator opening degree and the vehicle speed, at which the speed should be changed toward a side into which the variable speed ratio of the continuously variable transmission 4 is increased, that is, downshifting should be performed. These variable speed lines serve as boundaries of regions of combinations of the accelerator opening degree and the vehicle speed, at which different variable speed ratios are selected, in the variable speed diagram.

When the acceleration pedal is not operated during traveling, that is, when the acceleration is not requested during the traveling, the ECU 14 executes free-run traveling. The free-run traveling is control for causing the vehicle 1 to travel in a state where driving of the engine 2 is stopped and the C1 clutch 4d is disengaged. By execution of the free-run traveling, an inertia travel distance of the vehicle 1 can be increased, and the fuel efficiency can be improved. When the acceleration pedal is operated during the execution of the free-run traveling, that is, when the acceleration is requested during the execution of the free-run traveling, the ECU 14 returns the state of the vehicle 1 from the free-run traveling state to a normal traveling state by driving the engine 2 and engaging the C1 clutch 4d. In the normal traveling state, the vehicle 1 becomes able to perform acceleration by the power of the engine 2.

The hydraulic control device 15 has a function to supply oil pressure to the torque converter 3, the primary pulley 4a, the secondary pulley 4b, and the C1 clutch 4d. The hydraulic control device 15 changes the variable speed ratio of the continuously variable transmission 4 according to a variable speed ratio change instruction input from the ECU 14. To be specific, the hydraulic control device 15 controls the variable speed ratio and a variable speed by controlling inflow and outflow of the oil pressure to a primary pulley-side actuator. Further, the hydraulic control device 15 changes a pulley ratio by adjusting the oil pressure of the primary pulley-side actuator to continuously change the variable speed ratio of the continuously variable transmission 4.

The vehicle control device 10 having such a configuration suppresses the deterioration of the drivability when returning from the free-run traveling state to the normal traveling state by executing variable speed control processing described below. Hereinafter, an operation of the vehicle control device 10 that executes the variable speed control processing will be described with reference to FIGS. 3 to 5.

Variable Speed Control Processing

Figure 3:
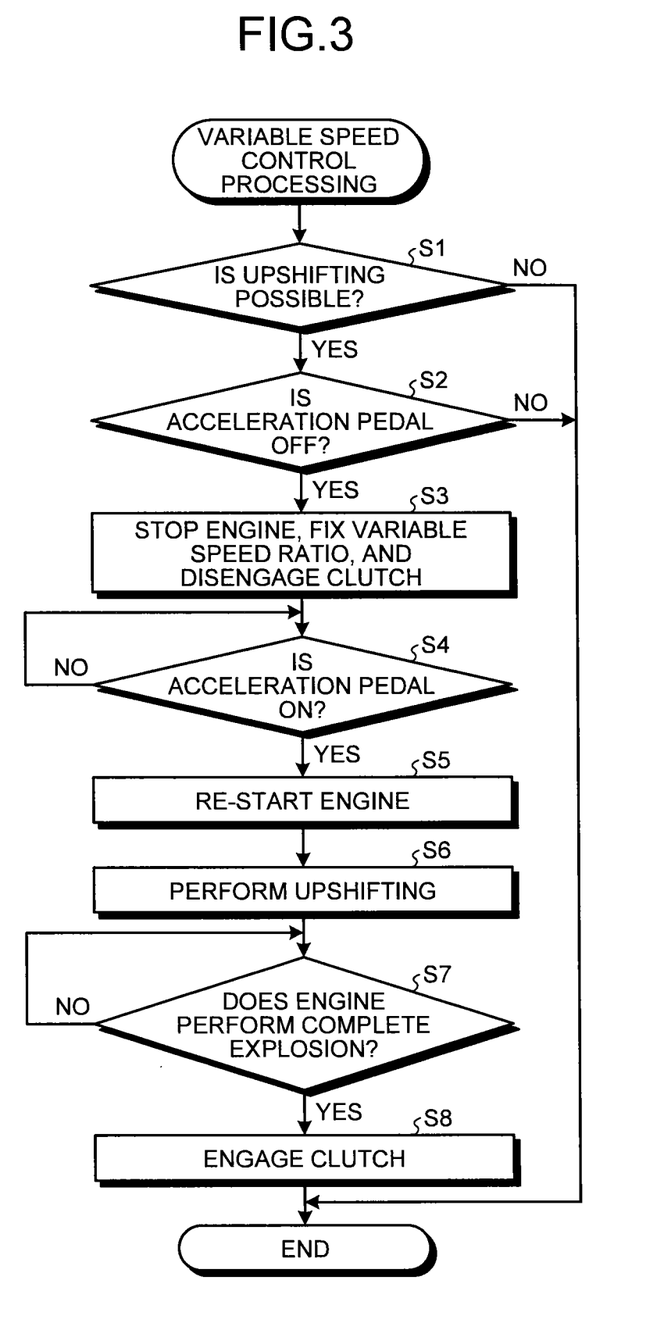
FIG. 3 is a flowchart illustrating a flow of variable speed control processing according to the embodiment of the present invention.
Figure 4:
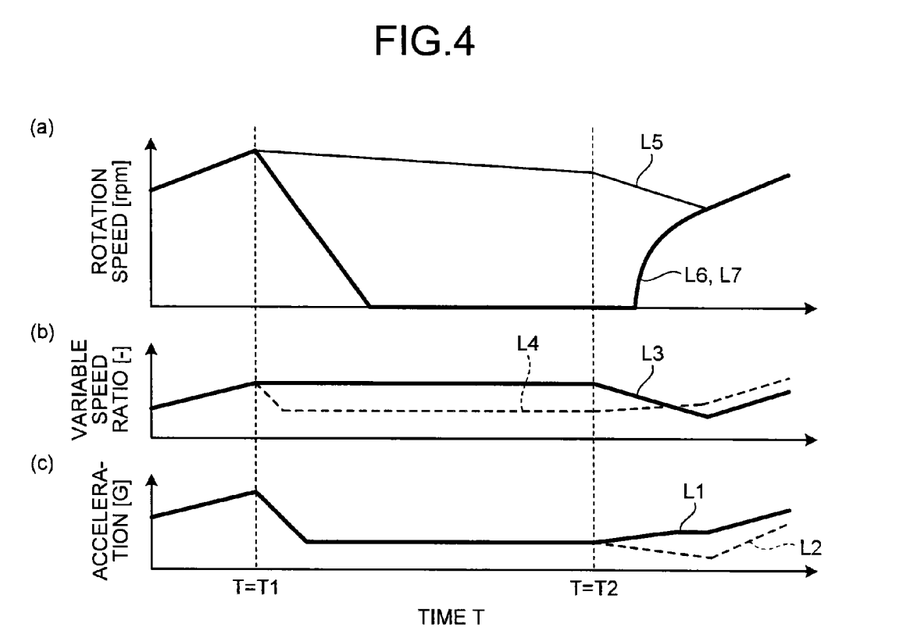
FIG. 4 is a timing chart for describing a flow of variable speed control processing according to the embodiment of the present invention.
Figure 5:
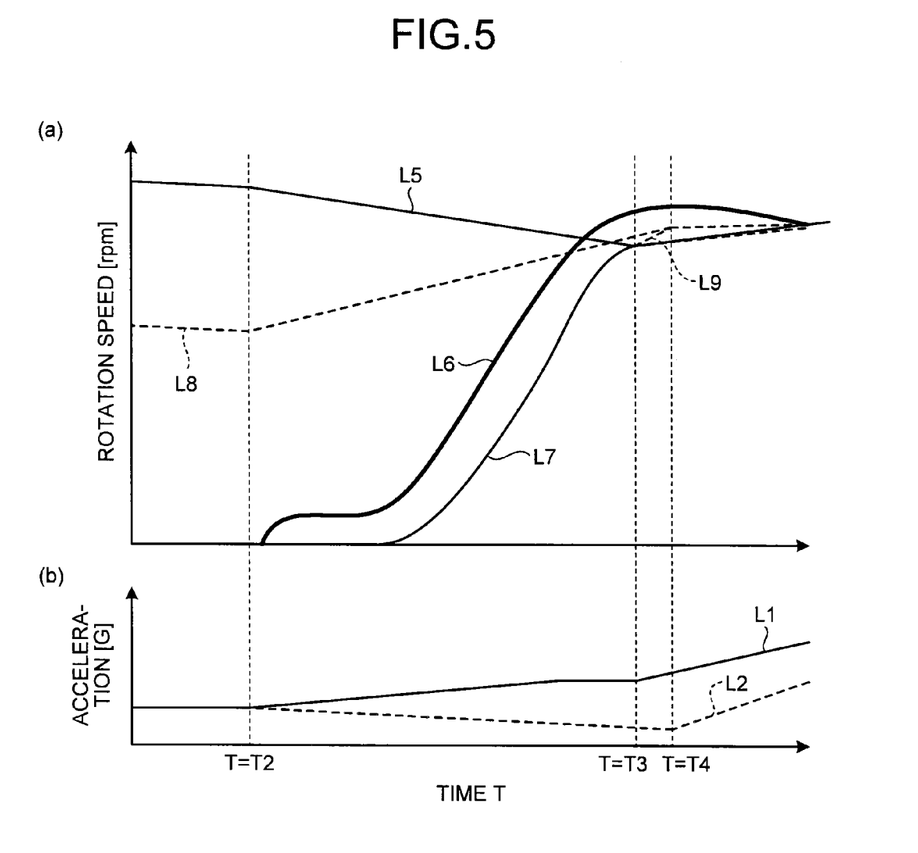
FIG. 5 is a diagram illustrating temporal change of acceleration, an engine rotation speed, a turbine rotation speed, and an input rotation speed, of a vehicle of when the vehicle returns from a free-run traveling state to a normal traveling state.

FIG. 3 is a flowchart illustrating a flow of the variable speed control processing according to the embodiment. FIG. 4 is a timing chart for describing a flow of the variable speed control processing according to the embodiment. FIG. 5 is a diagram illustrating temporal change of the acceleration, the engine rotation speed, the turbine rotation speed, and the input rotation speed, of a vehicle of when the vehicle returns from the free-run traveling state to the normal traveling state.

The flowchart illustrated in FIG. 3 is started at timing when an ignition switch of the vehicle 1 is switched from an OFF state to an ON state, and the variable speed control processing proceeds to step S1. The variable speed control processing is repeatedly executed in every predetermined control cycle while the ignition switch of the vehicle 1 is in the ON state.

In step S1, the ECU 14 determines whether a current operation point of the continuously variable transmission 4 on the variable speed diagram is in a region where the speed can be changed toward the side into which the variable speed ratio is decreased, that is, the upshifting can be performed, based on the signal that indicates the accelerator opening degree output from the accelerator position sensor 11 and the signal that indicates the vehicle speed output from the vehicle speed sensor 13. As a result of the determination, when the operation point of the continuously variable transmission 4 is not in the region where the upshifting can be performed (No at step S1), the ECU 14 terminates the series of the variable speed control processing. Meanwhile, when the operation point of the continuously variable transmission 4 is in the region where the upshifting can be performed (Yes at step S1), the ECU 14 advances the variable speed control processing to step S2.

In step S2, the ECU 14 determines whether the acceleration is OFF (the accelerator pedal is not operated), based on the signal that indicates the accelerator opening degree output from the accelerator position sensor 11. When the accelerator opening degree is a predetermine value or more, the ECU 14 determines that the accelerator pedal has been operated (acceleration ON) (No at step S2), and terminates the series of the variable speed control processing. Meanwhile, when the accelerator opening degree is less than the predetermined value, the ECU 14 determines that the accelerator pedal has not been operated (acceleration OFF) (Yes at step S2), and advances the variable speed control processing to step S3.

In step S3, the ECU 14 stops the engine 2, and fixes the variable speed ratio of the continuously variable transmission 4 to a current variable speed ratio. Further, the ECU 14 disengages the C1 clutch 4d by controlling the hydraulic control device 15. Accordingly, the ECU 14 completes the processing of step S3, and advances the variable speed control processing to step S4.

In step S4, the ECU 14 determines whether the accelerator pedal is operated, based on the signal that indicates the accelerator opening degree output from the accelerator position sensor 11. Then, the ECU 14 determines that the accelerator pedal has been operated (acceleration ON) (Yes at step S4) at timing when the accelerator opening degree is determined to be the predetermined value or more, and advances the variable speed control processing to step S5.

In step S5, the ECU 14 re-starts the engine 2. Accordingly, the ECU 14 completes the processing of step S5, and advances the variable speed control processing to step S6.

In step S6, the ECU 14 upshifts the continuously variable transmission 4 by controlling the hydraulic control device 15. Typically, at the time of start of the free-run traveling (a time T illustrated in FIG. 4=T1), the variable speed ratio of the continuously variable transmission 4 is decreased, as illustrated by the curved line L4 of FIG. 4(b). That is, the continuously variable transmission 4 is upshifted. Therefore, the inertia torque of the continuously variable transmission 4, which occurs in association with the upshifting, is wastefully consumed at the time of the free-run traveling. Accordingly, when the vehicle 1 returns from the free-run traveling state to the normal traveling state (the time T illustrated in FIG. 4=T2), the torque is not transmitted to the drive wheel 6 until the C1 clutch 4d is engaged.

In contrast, in the variable speed control processing according to the embodiment, at the time of start of the free-run traveling (the time T illustrated in FIG. 4=T1), the ECU 14 fixes the variable speed ratio of the continuously variable transmission 4, as illustrated by the curved line L3 of FIG. 4(b). Therefore, when the vehicle 1 returns from the free-run traveling state to the normal traveling state (the time T illustrated in FIG. 4=T2), the ECU 14 upshifts the continuously variable transmission 4, thereby to transmit the inertia torque of the continuously variable transmission 4 to the drive wheel 6 without waste. Note that the curved line L6 illustrated in FIG. 4(a) indicates the engine rotation speed, and the curved lines L1 and L2 illustrated in FIG. 4(c) respectively indicate the acceleration of the vehicle in the variable speed control processing of the present embodiment and of a conventional case. Accordingly, the ECU 14 completes the processing of step S6, and advances the variable speed control processing to step S7.

In step S7, the ECU 14 determines whether the engine 2 has performed complete explosion, based on the signal that indicates the engine rotation speed output from the engine rotation speed sensor 12. Here, the complete explosion indicates that the engine 2 moves onto a state in which the engine 2 is continuously rotated without auxiliary power such as a starter. In other words, the complete explosion indicates that the engine 2 moves onto a self-operable state. When the engine rotation speed becomes a rotation speed or more, the rotation speed being a threshold of the complete explosion determination, the ECU 14 determines that the engine 2 has performed the complete explosion. Note that the ECU 14 may determine that the engine 2 has performed the complete explosion at timing when the engine rotation speed is decreased after increased to a peak value at the time of start of the engine 2. The ECU 14 then advances the variable speed control processing to step S8 at timing when the engine 2 is determined to have performed the complete explosion.

In step S8, the ECU 14 starts the engagement of the C1 clutch 4*d* by increasing engagement oil pressure of the C1 clutch 4*d* by controlling the hydraulic control device 15. By the engagement of the C1 clutch 4*d*, the vehicle 1 becomes in the normal traveling state in which the vehicle 1 can perform acceleration by the power of the engine 2. Accordingly, the ECU 14 completes the processing of step S8, and terminates the series of the variable speed control processing.

As is clear from the above description, in the variable speed control processing according to the embodiment, the ECU 14 fixes the variable speed ratio of the continuously variable transmission 4 during execution of the free-run traveling, and upshifts the continuously variable transmission 4 when the vehicle 1 returns from the free-run traveling state to the normal traveling state. Therefore, when the vehicle 1 returns from the free-run traveling state to the normal traveling state, the inertia torque of the continuously variable transmission 4 can be transmitted to the drive wheel 6 without waste.

Further, in the conventional variable speed control processing, the continuously variable transmission 4 is upshifted according to a normal variable speed line at the time of execution of the free-run traveling, and the continuously variable transmission 4 is downshifted when the vehicle returns from the free-run traveling state to the normal traveling state (the curved line L4 illustrated in FIG. 4(*b*)). Therefore, in the conventional variable speed control processing, the rotation speed (input rotation speed) NIN (the curved line L8 illustrated in FIG. 5(*a*)) of the C1 clutch 4*d* of the drive wheel 6 side is increased without input torque, at the time of return from the free-run traveling state (the time T illustrated in FIG. 5=T2). As a result, the sense of drawing of deceleration (the curved line L2 illustrated in FIG. 5(*b*)) due to downshifting occurs, and a difference between the rotation speed (turbine rotation speed) NT of the C1 clutch 4*d* of the engine 2 side (the curved line L7 illustrated in FIG. 5(*a*)) and the input rotation speed NIN is expanded, and a lot of time is required to engage the C1 clutch 4*d*. Accordingly, a time (T4−T2) from the time of return from the free-run traveling state (the time T=T2) to a point of time when the vehicle 1 is re-accelerated by the engine 2 (the time T=T4) becomes long. Note that the curved line L6 illustrated in FIG. 5(*a*) indicates the engine rotation speed.

In contrast, in the variable speed control processing according to the embodiment, the continuously variable transmission 4 is upshifted when the vehicle 1 returns from the free-run traveling state to the normal traveling state. Therefore, the sense of drawing of deceleration due to downshifting does not occur when the vehicle 1 returns from the free-run traveling state (the curved line L1 illustrated in FIG. 5(*b*)). Further, the input rotation speed NIN (the curved line L5 illustrated in FIG. 5(*a*)) is decreased by the upshifting of the continuously variable transmission 4. Therefore, the difference between the turbine rotation speed NT and the input rotation speed NIN is smaller than that in the conventional variable speed control processing. As a result, the time required from the time of return from the free-run traveling to when the C1 clutch 4*d* is engaged becomes short, and a time (T3−T2) from the time of return from the free-run traveling state (the time T=T2) to a point of time when the vehicle 1 is re-accelerated by the engine 2 (the time T=T3) becomes short.

As described above, according to the variable speed control processing according to the embodiment, when the vehicle 1 returns from the free-run traveling state to the normal traveling state, the inertia torque of the continuously variable transmission 4 can be transmitted to the drive wheel 6 without waste, and the time required to re-accelerate the vehicle 1 by the engine 2 can be shortened. Therefore, the difficulty of the driver in feeling the sense of acceleration and the deterioration of the drivability can be suppressed.

Further, according to the variable speed control processing according to the embodiment, the ECU 14 upshifts the continuously variable transmission 4 before starting the engagement of the C1 clutch 4*d*. Therefore, the inertia torque of the continuously variable transmission 4 can be transmitted to the drive wheel 6 before the output torque of the engine 2 is transmitted to the drive wheel 6.

As described above, an embodiment to which the invention made by the inventors of the present application is applied has been described. However, the present invention is not limited by the description and the drawings that are a part of the disclosure of the present invention by the present embodiment. For example, in the present embodiment, the ECU 14 fixes the variable speed ratio of the continuously variable transmission 4 at the time of the free-run traveling. However, the ECU 14 may be configured as long as it is does not upshift the continuously variable transmission 4. That is, the ECU 14 may change the speed toward a side into which the variable speed ratio of the continuously variable transmission 4 is increased, that is, may downshift the continuously variable transmission 4, instead of fixing the variable speed ratio of the continuously variable transmission 4 at the time of the free-run traveling. When the ECU 14 downshifts the continuously variable transmission 4, the sense of drawing due to deceleration of the downshifting occurs at the time of execution of the free-run traveling. However, the inertia torque of the continuously variable transmission 4 transmitted to the drive wheel 6 becomes larger when the vehicle 1 returns from the free-run traveling state to the normal traveling state. Therefore, the deterioration of the drivability can be further suppressed. Further, in the present embodiment, the present invention is applied to a vehicle without a motor that can execute the free-run traveling. However, the present invention may be applied to a vehicle that includes a motor and can execute the free-run traveling, such as a hybrid vehicle. As described above, all of other embodiments, examples, operation technologies, and the like, which are made by a person skilled in the art and the like, on the basis of the present embodiment, are included in the scope of the present invention.

According to the vehicle control device and the vehicle control method of the embodiment, when the vehicle returns from the free-run traveling state to the normal traveling state, inertia torque of the continuously variable transmission can be transmitted to the drive wheel without waste, and time required to accelerate the vehicle by the engine can be shortened. Therefore, the difficulty of the driver in feeling the sense of acceleration and the deterioration of the drivability can be suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle control device comprising:
    a control unit configured to execute free-run traveling in which an engine is stopped and a clutch that transmits power of the engine to a drive wheel is disengaged, at a time acceleration is not requested during traveling, wherein
    the control unit is configured to prohibit upshifting of a continuously variable transmission at least during execution of the free-run traveling, drive the engine from the free-run traveling state in response to an acceleration request, and upshift the continuously variable transmission at a time of returning to a normal traveling state in which the clutch is engaged.

2. The vehicle control device according to claim 1, wherein the control unit is configured to upshift the continuously variable transmission before starting engagement of the clutch.

3. The vehicle control device according to claim 2, wherein the control unit is configured to fix a variable speed ratio of the continuously variable transmission during the execution of the free-run traveling.

4. The vehicle control device according to claim 1, wherein the control unit is configured to fix a variable speed ratio of the continuously variable transmission during the execution of the free-run traveling.

5. A vehicle control method comprising:
    a control step of executing free-run traveling in which an engine is stopped and a clutch that transmits power of the engine to a drive wheel is disengaged, at a time acceleration is not requested during traveling, wherein
    the control step includes:
        prohibiting upshifting of a continuously variable transmission at least during execution of the free-run traveling;
        driving the engine from the free-run traveling state in response to an acceleration request; and
        upshifting the continuously variable transmission at a time of returning to a normal traveling state in which the clutch is engaged.

* * * * *